United States Patent [19]
DuPont, Jr.

[11] Patent Number: 5,176,411
[45] Date of Patent: Jan. 5, 1993

[54] RE-USABLE COUPLING FOR SANITARY HOSES

[75] Inventor: Paul R. DuPont, Jr., Andover, N.J.

[73] Assignee: Sani-Tech Incorporated, Andover, N.J.

[21] Appl. No.: 628,610

[22] Filed: Dec. 17, 1990

[51] Int. Cl.⁵ .............................................. F16L 33/22
[52] U.S. Cl. .................................. 285/249; 285/255; 285/323
[58] Field of Search ............... 285/249, 255, 174, 322, 285/323

[56] References Cited

U.S. PATENT DOCUMENTS

| | | | |
|---|---|---|---|
| 1,098,294 | 5/1914 | Patty | 285/249 |
| 3,730,564 | 5/1973 | Bachle et al. | 285/249 X |
| 4,157,843 | 6/1975 | Trnka et al. | 285/255 X |
| 4,303,263 | 12/1981 | Legris | 285/249 |

FOREIGN PATENT DOCUMENTS

| | | | |
|---|---|---|---|
| 506986 | 11/1954 | Canada | 285/249 |
| 80328 | 4/1951 | Czechoslovakia | 285/249 |
| 1453647 | 9/1966 | France | 285/249 |
| 2260056 | 8/1975 | France | 285/249 |
| 809097 | 2/1959 | United Kingdom | 285/249 |

Primary Examiner—Randolph A. Reese
Assistant Examiner—Heather Chun
Attorney, Agent, or Firm—Howard R. Popper

[57] ABSTRACT

A three-part, re-usable coupling for making a sanitary connection to a flexible hose is disclosed which includes a coupling body of corrosion-resistant material having a central channel for laminar flow. At one end of the central bore, the coupling body is provided with a standard sanitary conduit flange-face. At the other end the coupling body is provided with a notched, substantially cylindrical barb for insertion into the lumen of the flexible hose. An externally threaded section lies between the two ends of the coupling body. A split collar or sleeve which is at least as long as the barb has an externally tapered surface and a cylindrical, internal, threaded surface applies uniform compression to the end-portion of the flexible hose through which the barb is inserted. A nut having an internal taper that matches the external taper of the split collar makes up on the external threads of the coupling body urging the split collar to firmly secure the hose to the barb. The introduction of the substantially cylindrical barb into the lumen of the flexible hose avoids the creation of any crevices that could give rise to capillary action that could lead to the unwanted accumulation of material from the fluid stream carried by the hose. The coupling can be reused when it becomes necessary to replace the hose to which it is attached.

4 Claims, 1 Drawing Sheet

RE-USABLE COUPLING FOR SANITARY HOSES

TECHNICAL FIELD

This invention relates to couplings for flexible hoses and, more particularly, to couplings for hoses that must meet stringent sanitarian requirements.

BACKGROUND ART

Sanitary conduit for use in the dairy, food processing and beverage industries must not only be corrosion resistant but must provide a flow path that is free of all discontinuities or crevices that could trap the particulate matter that may be carried by the fluid stream. Sanitarians recognize that any accumulation of particulates may give rise to decay that could contaminate the fluid stream. To provide such a crevice-free, "streamline" flow path, extensive use is made of smooth-bore stainless steel piping equipped with special sanitary-use fittings.

In addition to the fixed piping system, however, almost every installation has a need for some flexible connections. The rigid sanitarian proscription against the presence of crevices and traps rule out the use of conventional hose fittings and have heretofore required that the stainless steel sanitary fittings had to be permanently attached to the flexible hoses. Such attachment could only be accomplished at a factory or with special tools.

In practice, the usable life of a flexible hose tends to be much shorter than that of fixed stainless steel piping. When it becomes necessary from time to time to replace such hoses it has not heretofore been possible to reuse the permanently attached and costly stainless steel fitting. It is accordingly an object of the present invention to provide a stainless steel sanitary fitting that could be detached and re-used with a new hose. Moreover, it would be advantageous to provide a fitting that meets sanitarian requirement and that can be installed in the field by an end-user without the need for special tools.

SUMMARY OF THE INVENTION

The foregoing problems are solved in accordance with the principles of the present invention by providing a corrosion-resistant and re-usable three-part coupling. The coupling body provides a central channel for laminar flow. At one end of the central bore, the coupling body is provided with a standard flange-face for mating with the standard sanitary conduit flange-face. At the other end the coupling body is provided with a notched, substantially cylindrical barb for insertion into the flexible tubing. An externally threaded section lies between the two ends of the coupling body. A split collar or sleeve having an externally tapered surface and a threaded internal surface engages the end-portion of the flexible hose through which the barb is inserted. A nut having an internal taper that matches the external taper of the split collar makes up on the external threads of the coupling body urging the split collar to firmly secure the hose to the barb. The introduction of the substantially cylindrical barb into the lumen of the flexible hose prevents the creation of crevices or discontinuities that might give rise to capillary action and the capture and stagnation of material carried by the fluid stream. Accordingly, the coupling will meet sanitarian requirements but can be reused when it becomes necessary to replace the hose to which it is attached.

DETAILED DESCRIPTION

Figure 1:
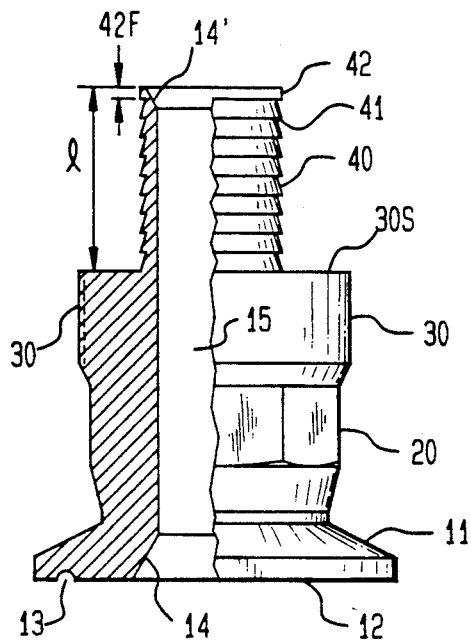
FIG. 1 is a partial cross-sectional view of the coupling body of the invention.

Referring to Figure there is shown a partial cross-sectional view of the body 10 of the removable flexible hose coupling of my invention. Coupling body 10 includes a flange 11 having an a coupling face 12 provided with a circular facial groove 13 for retaining a sanitary gasket (not shown). The central bore 15 of body 10 is provided with bell-mouthed ends 14 —14' to provide a smooth transition to the lumen of the flexible hose 70 (shown in FIG. 4) with which the coupling is to be used.

Coupling body 10 includes an external hexagonal portion 20 so that the coupling can be gripped by a wrench, not shown.

Figure 2:
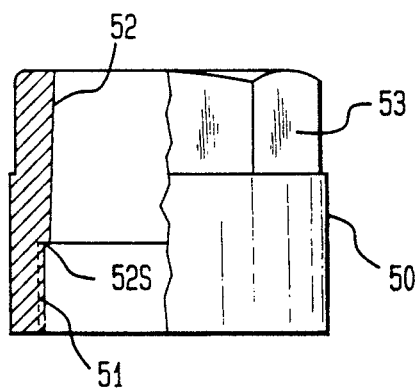
FIG. 2 is a partial cross-sectional view of the nut that makes up on the coupling body.

Coupling body 10 is provided with a series of external threads 30 for mating with nut 50 of FIG. 2.

Figure 4:
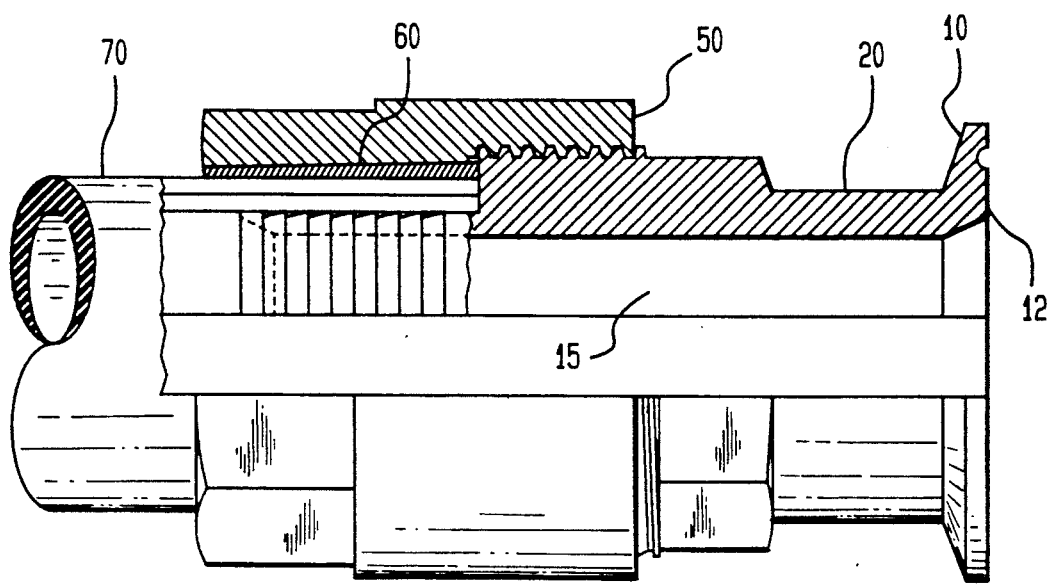
FIG. 4 is a partial cross-sectional view of the parts of FIGS. 1, 2 and assembled with a flexible hose.

Coupling body is provided with a barbed spud 40 dimensioned so as to fit inside the lumen of flexible hose 70 (shown in FIG. 4). Barbed spud 40 is of substantially cylindrical external contour having a series of evenly-spaced angular undercuts 41 and is provided with a finial end-ring 42 which is cylindrical and not undercut. The axial length, l, of spud 40 is closely related to the axial length, l, of the tapered portion of collar or sleeve 60, as will hereinafter be explained.

Figure 3:
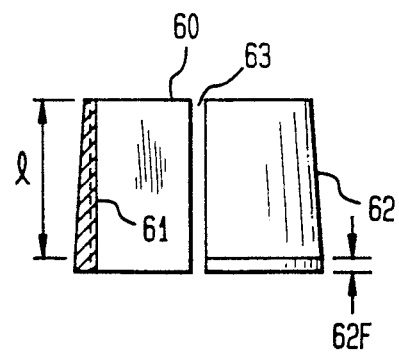
FIG. 3 is a partial cross-sectional view of the threaded split collar which together with the nut of FIG. 2 secures the flexible hose to the coupling body.

FIG. 2 shows the nut 50 which is used with the coupling. The first portion of nut 50 comprises a series of internal threads 51 which are designed to mate with the external threads 30 of coupling body 10. The next portion of nut 50 is the internal taper portion 52 which matches the external taper of collar or sleeve 60 which is shown in FIG. 3. The third portion of nut 50 comprises external hexagon 53 which is designed to be held by a second wrench (not shown) so that nut 50 can be made up on coupling body 10.

FIG. 3 shows the split ring collar or sleeve 60. Over the portion l of sleeve 60's axial dimension (which equals the axial length l of barbed spud 40 of FIG. 1), the external surface 62 of collar 60 is tapered to match the internal taper 52 of nut 50. At the wide end of collar 60 there is an additional base section 62F which has a constant cylindrical diameter rather than being tapered. The cylindrical base section 62F of collar 60 prevents the shoulder 52S of nut 50 from contacting the shoulder 30S of body 10 when nut 50 is made up on threads 30 of body 10. As shown in FIG. 4, cylindrical base section 62F prevents the wedging action of the nut 50 and collar 60 upon hose 70 from being prematurely terminated by the contacting of shoulder 52S with shoulder 30S. Collar 60 is split by a saw cut and provides a gap 63 that is closed under the camming action of taper 52 when nut 50 is made up on coupling body 10. The internal surface of collar 60 is provided with a gripping surface 61 such as series of machined threads for facilitating the engagement of the sleeve with the outside surface of hose 70.

In FIG. 4 there is shown a partial cross-sectional view of the sanitary-use coupling assembled to a flexible hose 70. The reference numerals in FIG. 4 denote corresponding elements shown in FIGS. 1 through 3. When nut 50 is made up on the threads 30 of coupling body 10, tapered surface 52 of nut 50 engages tapered surface 62 of split collar 60 forcing the split in collar 60 together and urging the lumina of hose 70 tightly about the cylindrical shape of barb 40 and its finial end-ring 42.

It is to be noted that the axial length, l, of split collar 60 is made sufficiently long to slightly overlap end-ring 42 thereby enabling the lumen of the hose to be compressed about the finial portion of end-ring 42. In this manner the hose lumen smoothly transitions to the bell-mouthed lumen 14' of the central bore 15 of body 10. The terminal portion of end ring 42 is thereby shielded against disturbing the lamina flow of the fluid carried by the hose and hose 70 is thereby subjected to uniform, cylindrical compression which prevents the formation of any "capillary crevices" between the hose and the coupling that might lead to an undesired accumulation of stagnant material. Accordingly, the making-up of nut 50 in causing sleeve 62 to uniformly compress hose 70 about the uniform-length cylindrical finial ring 42 of barb 40 provides a sanitary connection that is free of crevices that would permit fluids to migrate into an interstitial space between the hose and the barb and there putrefy. In other words, a capillary-free compression of the hose about the barb is obtained. In one illustrative embodiment the overall axial length (l+62F) of collar 60 is approximately 0.050" longer than the length of spud 40.

In one illustrative embodiment of a coupling body designed for use with a flexible hose having nominal I.D. of ¾", an O.D. of approximately 1 9/64" and made of Silicon STHT tubing type, the dimensions (in inches) of the coupling were as follows:

| | |
|---|---|
| Flange-end diam 11 | = 0.875 |
| Central bore 15 | = 0.625 |
| Axial length l | = 0.950 |
| Length 62F of collar 60 | = 0.050 |
| Axial length, 42F, of end-ring 42 | = 0.10 |
| Depth of barb undercut 41 | = 0.015 |
| Length of barb undercut 41 | = 0.100 |

It is to be appreciated that as larger hose diameters are to be accommodated, the strength of threads 51 is to be increased to withstand the increased torque that can be applied. Further and other changes will be apparent to those skilled in the art without depurting from the spirit of my invention.

What is claimed is:

1. A re-usable coupling for use with flexible sanitary conduit, comprising:

an externally threaded body of corrosion-resistant material having a smooth lumen, said body having a flange-face at one end and a cylindrical spud of predetermined length at its other end for insertion into said flexible conduit, said body having a shoulder against which said conduit may butt when said spud is inserted into the lumen of said flexible conduit, said spud having a series of stepped sections terminating at the end opposite said shoulder in a cylindrical finial ring of substantially uniform diameter throughout a portion of said predetermined length of said spud, a sleeve having a portion of its axial length exceeding said predetermined length, said sleeve having an inner diameter approximately matching the outer diameter of said conduit and a tapered external surface, and a nut having threads to make up with said threads of said coupling body, said nut further having an internal tapered portion that matches said tapered external surface of said sleeve, whereby the making-up said nut on said threads of said coupling body urges said portion of said sleeve exceeding said predetermined length to provide a capillary-free compression of said conduit about said cylindrical finial ring of said spud.

2. A coupling according to claim 1 wherein said sleeve is a split collar having a pre-set gap and wherein said making up of said nut reduces said gap.

3. A coupling according to claim 2 wherein said lumen of said coupling body adjacent said finial ring of said spud is bell-mouthed.

4. A coupling according to claim 1 wherein said cylindrical internal surface of said split collar is threaded to facilitate engagement with said diameter of said flexible conduit.

* * * * *